June 2, 1942.        L. S. HAFNER ET AL        2,285,271

BROILER

Filed April 10, 1940

Inventors

Patented June 2, 1942

2,285,271

UNITED STATES PATENT OFFICE 2,285,271

BROILER

Louis S. Hafner and Francis L. Newton, Chicago, Ill.

Application April 10, 1940, Serial No. 328,862

5 Claims. (Cl. 53—5)

Our invention relates in general to broilers or roasters, and more particularly to improvements in broilers or roasters adapted to broiling or cooking sausages or the like.

To those familiar with the sausage business and to many others, it is a truism that any sausage which is boiled as a preliminary to serving, loses a major portion of its really fine flavor. The ideal method of preparation is to broil said sausages or the like, preferably over an open flame.

In the average household this end is attained with considerable difficulty, due in part to the general lack of facilities, and in great measure to the tendency of sausages to curl when alternate sides are broiled. Said curling tendency causes the ends to more nearly approach the flame than other portions, with a resultant uneven charring which is deleterious to flavor. Curling also makes it impossible to turn the sausages through an angle of 90 degrees to brown the opposite side.

Due to such obstacles in preparation it has been almost universal practice to heat most styles of linked sausage, particularly frankfurters, by immersing in hot water and usually by boiling until the casings rupture, losing a great deal of the food value as well as the flavor. This practice has placed linked sausages in disrepute, as a food lacking the finer flavor with which it has actually been liberally endowed.

It is therefore an object of our invention to provide a means of packaging link sausage or the like so as to obtain an optimum of eye-appeal in a convenient sized unit which may be sold as a complete unit ready to insert in a broiling oven.

A further object is to provide a means for conveniently preparing said link sausages or the like in the manner in which they are intended to be prepared, namely by broiling, to further enhance their flavor.

It is a further object to provide a broiler rack of such simplified design as to be very inexpensive in manufacture which may conceivably be given away with the purchase of a pound of sausage, or be sold at a very low price in the order of two cents each or less.

It is a further object to provide a broiler rack which will prevent curling of broiling sausages.

It is also an object to provide a facile means of removing said sausages while hot.

It is also an object to provide a means for turning the entire unit, thus broiling the opposite side.

It is thus a general object to provide an innovation in the sausage industry which will greatly increase consumer appeal and at a negligible cost, greatly enhance the value of the product dispensed.

Figure 1:
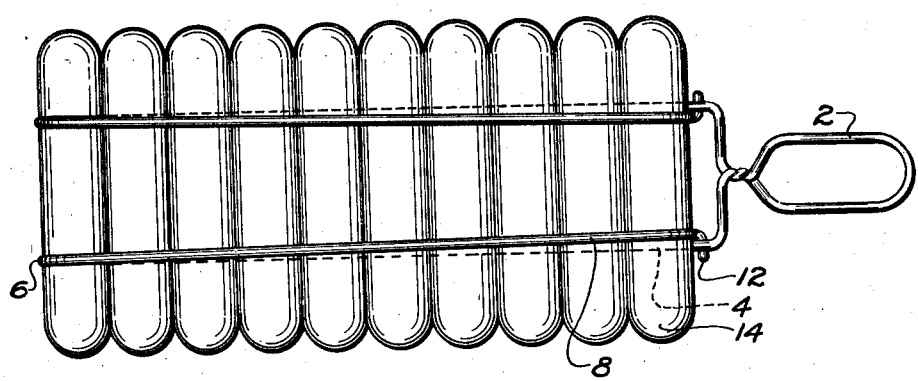
Figure 2:
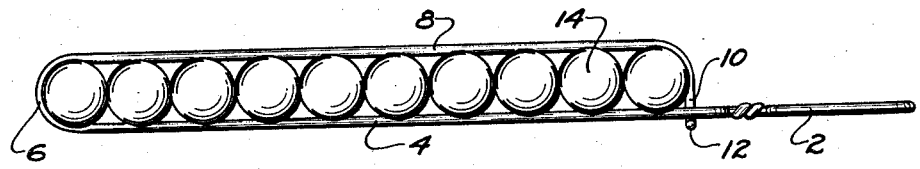

Other objects will appear from the following description, reference being had to the accompanying drawing in which:

Figure 1 is a plan view of our invention showing a plurality of sausages held by same; and Figure 2 is a side elevation of same.

The embodiment of our invention illustrated in the accompanying drawing comprises a unitary wire frame in which a handle portion 2 is formed in the preferred form by twisting, but which may also be made in other ways such as by welding, etc. Said handle portion is preferably as short as is consistent with good practice, permitting a satisfactory handhold, in order to fit in small size broiler ovens. Body portions are formed by doubling back straight sections 4 around bends 6 and continuing with straight sections 8 to form two U-shaped arms which are of such dimensions and shape as to grip sausages or the like 14 on diametrically opposite sides. Downwardly turned portions 10 terminate in outwardly turned ends 12 for interlocking with body portion 4. Downwardly turned portions 10 and outwardly turned ends 12 form a means for retaining sausages 14 while broiling and a means of releasing said sausages for serving.

The device described above lends itself readily to packing in the sausage factory where the sausages are inserted and the interlocking portions locked. Said sausages may readily be removed by the consumer while hot after broiling, by holding the handle with a pot holder and releasing the interlocking ends with a fork.

The device of our invention is suitable for broiling a variety of articles, but is designed particularly for Frankfurts, skinless Frankfurts, linked sausages or the like. It is also designed and adapted for packing said sausages in a predetermined unit such as a pound or a half pound as a retail unit ready for dispensing and broiling.

It is our intention to stress the value of broiling over the usual method of boiling, the value of a dispensing unit which is ready to insert in the broiler oven without further preparation, the ease with which our broiler may be turned and the sausages removed, and the extreme simplicity with which we arrive at these ends permitting very inexpensive manufacture. It is our intention that such broilers be used but once and be discarded, one being included with each pound of sausages sold.

We have herein shown and described a preferred form of our invention, but it will be apparent to those skilled in the art that variations in the disclosed construction may be made without departing from the basic idea. We therefore do not wish to be limited to the precise details as herein set forth, but desire to include within the scope of the accompanying claims, all such equivalent construction as may be usable to accomplish the same results in substantially the same way.

Having thus described our invention, what we claim as new and desire to secure by Letters Patent is:

1. A broiler comprising a unitary wire frame having a handle portion, body portions so constructed and arranged as to engage a plurality of sausages or the like upon opposite sides thereof at a distance from their centers and maintaining a substantially flat and parallel arrangement of said sausages during broiling, and downwardly turned portions interlocking with body portions to retain said sausages.

2. A device for supporting a plurality of sausages or the like for broiling, comprising a unitary wire frame having a handle portion, body portions so constructed and arranged as to engage said sausages upon opposite sides thereof at a distance from their centers and maintaining a substantially flat and parallel arrangement of said sausages; and downwardly turned portions interlocking with said body portions to retain said sausages.

3. A unitary wire frame for supporting a plurality of sausages or the like for broiling, comprising a handle portion, body portions so constructed and arranged as to engage said sausages upon opposite sides thereof at a distance from their centers to maintain a substantially flat and parallel arrangement of said sausages; and downwardly turned portions interlocking with body portions to retain said sausages.

4. A sausage package for unit retailing comprising a unitary wire frame having a handle portion, body portions so constructed and arranged as to engage a plurality of sausages or the like upon opposite sides thereof at a distance from their centers for maintaining a substantially flat and parallel arrangement of said sausages during broiling, and means interlocking with said body portions to retain said sausages.

5. A device for supporting a plurality of sausages for retailing and cooking, comprising an integral wire bent to form a handle and a pair of elongated U-shaped arms formed and constructed to embrace and grip a plurality of sausages placed side by side.

L. S. HAFNER.
F. L. NEWTON.